J. KRIZEK.
APPARATUS FOR SECURING ALCOHOL FROM BAKING BREAD.
APPLICATION FILED APR. 6, 1918.
1,314,082.
Patented Aug. 26, 1919.
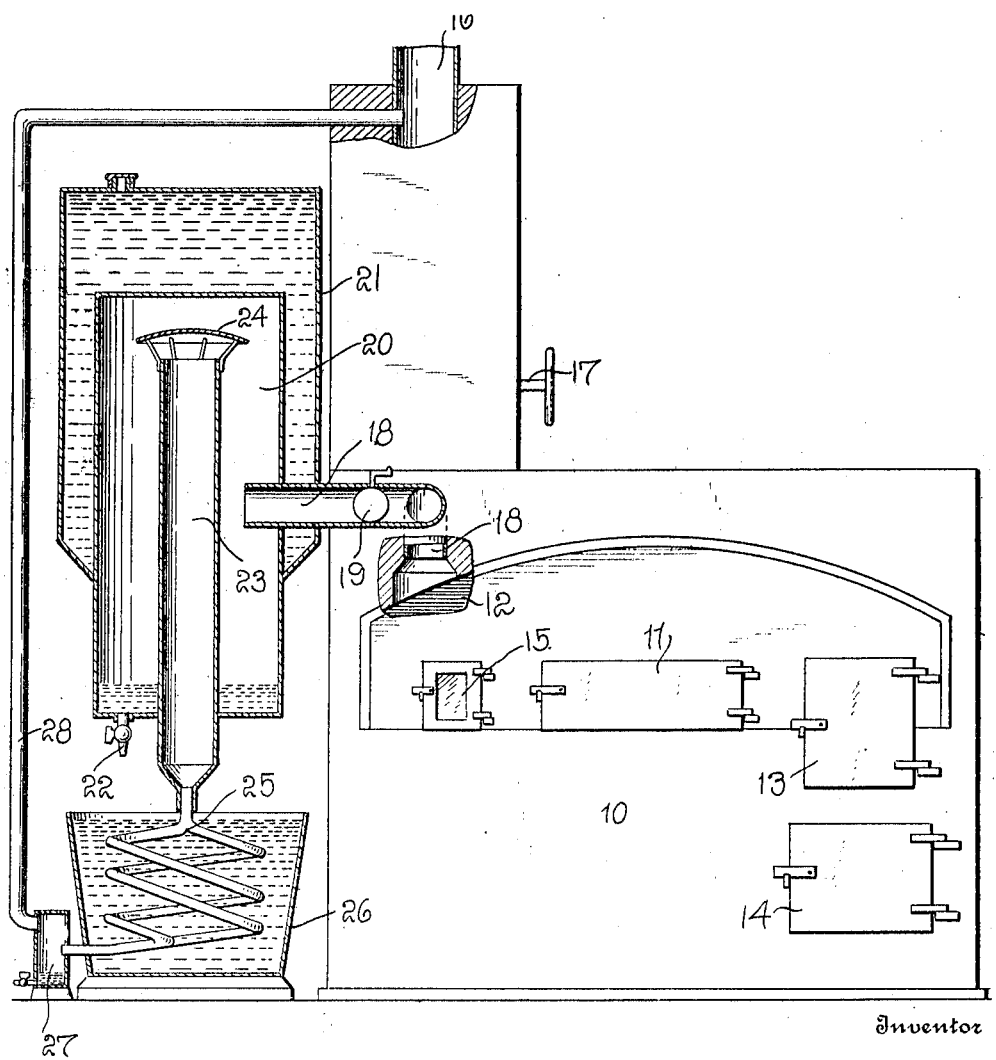
Inventor
Joseph Krizek
By Watson E. Coleman
Attorney

UNITED STATES PATENT OFFICE.

JOSEPH KRIZEK, OF GALLUP, NEW MEXICO, ASSIGNOR OF ONE-THIRD TO PETER KITCHEN AND ONE-THIRD TO JOSEPH IVOR PISCEK, BOTH OF McKINLEY COUNTY, NEW MEXICO.

APPARATUS FOR SECURING ALCOHOL FROM BAKING BREAD.

1,314,082.

Specification of Letters Patent. Patented Aug. 26, 1919.

Application filed April 6, 1918. Serial No. 227,052.

*To all whom it may concern:*

Be it known that I, JOSEPH KRIZEK, a subject of the Emperor of Austria, residing at Gallup, in the county of McKinley and State of New Mexico, have invented certain new and useful Improvements in Apparatus for Securing Alcohol from Baking Bread, of which the following is a specification, reference being had to the accompanying drawings.

This invention relates to means for producing alcohol and particularly to an apparatus for producing alcohol from the vapors and fumes arising from the baking of bread.

The general object of this invention is to provide a very simple apparatus forming part of an ordinary baking oven whereby the fumes and vapors arising from the baking of bread may be condensed so as to secure the alcohol therein.

A further object is to provide a very simple mechanism of this character by which commercial alcohol in relatively large quantities may be secured from these otherwise wasted fumes.

My invention is illustrated in the accompanying drawings, wherein:—

The figure is a front elevation of a baking oven of ordinary structure, this oven being shown partly in section and illustrated in connection with a condenser of improved form whereby the alcoholic vapors arising from the baking of bread in the oven may be condensed, the condenser being illustrated in section.

Referring to the figure, 10 designates a bake oven of any suitable or ordinary construction. Inasmuch as this bake oven may be of any suitable form, I have not illustrated the details of any part of the oven, it being sufficient to say that 11 designates the door in the oven for the bread, and 12 the oven space itself, 13 the furnace door, 14 the ash door, and 15 a window into the oven whereby the condition of the bread being baked therein may be observed.

Extending from the oven is the flue 16. This flue extends vertically upward and ordinarily discharges the steam fumes and vapor from the baking oven. This flue is ordinarily provided with a damper of usual character, the handle of which is designated 17.

Extending from the oven 16 is a lateral duct or flue 18 provided with a damper 19. This flue 18 opens into a drum 20 which is disposed within a water container or outer drum 21, which is designed to be filled with water or other liquid so as to cool and condense the vapors in the drum 20. In the drum 20 the watery part of the vapors condenses more or less and this condensation can be drawn off at the outlet tap 22. In the lower portion of the drum the condensed vapors which collect in the bottom of the drum 20 contain only two or three per cent. of alcohol which can easily be recovered from the condensation.

Extending downward from the upper portion of the drum 20 is a third drum 23, which is open at its upper end and provided with a hood 24. This drum 23 extends through the bottom of the drum 26 and is tapered at its lower end and connected to a worm 25, which is illustrated as a double worm. This worm is disposed within an open tub 26 filled with cooling water and the vapors passing down from the drum 23 into the worm 25 are condensed into a liquid form and carry a certain per cent. of commercially pure alcohol. This alcohol flows into the container 27 and may be drawn therefrom into any receiver. The alcohol is mixed with a certain percentage of water and can be recovered from the water by another distillation. A relatively greater percentage of alcohol may be secured from rye and Graham bread than from wheat bread. The receiver or container 27 is provided with a vent pipe 28 which extends up to the upper end stack or flue 16 and carries off waste fumes and also creates a draft through the worm 25.

With this apparatus, I have been able to recover from a pint and a half to two pints of commercially pure alcohol from a baking of five hundred loaves of wheat bread and about double that amount of alcohol from a similar amount of rye bread.

The mechanism illustrated in the drawing is particularly necessary in the securing of alcohol from baking bread for the reason that the condenser is so constructed that the fumes passing from the oven go slowly through the condenser, and furthermore because the flue or pipe 18 leading into the condenser is provided with the valve 19 whereby passage therethrough may be regulated. The fumes must be drawn from the oven neither too swiftly nor too slowly, as a too rapid removal of the fumes or a too slow removal will interfere with the proper baking of the bread. In view of the amount of bread baked in large city bakeries, in camp bakeries, and in the relatively small bakeries throughout the country, it is apparent that a very large amount of alcohol is now going to waste which could be recovered and utilized for commercial purposes by the installation of this device.

While I have illustrated a particular form of my invention which I have found to be entirely effective for the purpose described, it will be understood that I do not wish to be limited to any particular form, as it is obvious that the details may be varied in many ways without departing from the spirit of the invention.

Having described my invention, what I claim is:—

An apparatus of the character described comprising a bake oven, a flue leading from the upper portion thereof and provided with a damper, a drum into which said flue discharges having a tap at its bottom and closed ends, a water filled drum disposed around the first named drum and acting as a water jacket, a third drum disposed within the first drum and open at its top and extending through the bottom of the first named drum, a worm into which the third named drum discharges and disposed within a water container, a container into which the worm discharges having a tap whereby the contents thereof may be withdrawn, and a vent pipe leading therefrom.

In testimony whereof I hereunto affix my signature in the presence of two witnesses.

JOSEPH KRIZEK.

Witnesses:
 PETER KITCHEN,
 JOSEF PISCEK.